United States Patent

[11] 3,592,212

| [72] | Inventors | James A. Schleimer<br>Ventura, Calif. 93003;<br>Arthur M. Beavens, Manhattan Beach,<br>Calif. |
|---|---|---|
| [21] | Appl. No. | 886,287 |
| [22] | Filed | Dec. 18, 1969 |
| [45] | Patented | July 13, 1971 |
| [73] | Assignee | Said Schleimer by said Beavens |

[54] WATER TREATMENT SYSTEM
8 Claims, 6 Drawing Figs.

[52] U.S. Cl. ............................................. 137/93,
137/88, 324/30, 340/412
[51] Int. Cl. ........................................... G05d 11/08
[50] Field of Search .................................. 137/5, 88,
93; 210/85; 324/30; 340/236, 412, 413, 415, 421

[56] References Cited
UNITED STATES PATENTS
3,361,150  1/1968  Horner ..................... 137/93

Primary Examiner—Robert G. Nilson
Attorney—John Joseph Hall

ABSTRACT: A water treatment system having a scanner circuit which monitors and controls and takes corrective action upon receiving signals from pH-sensing apparatus, conductivity-sensing apparatus, or corrosion rate sensing apparatus, singly or together, and provides electrical timing means for stopping or starting acid or alkaline feed equipment, bleed valves in the system, and various pump means for adding chemicals to the system.

INVENTORS.
JAMES A. SCHLEIMER
ARTHUR M. BEAVENS
BY John Joseph Hall
ATTORNEY.

INVENTORS.
JAMES A. SCHEIMER
ARTHUR M. BEAVENS

By John Joseph Hall
ATTORNEY.

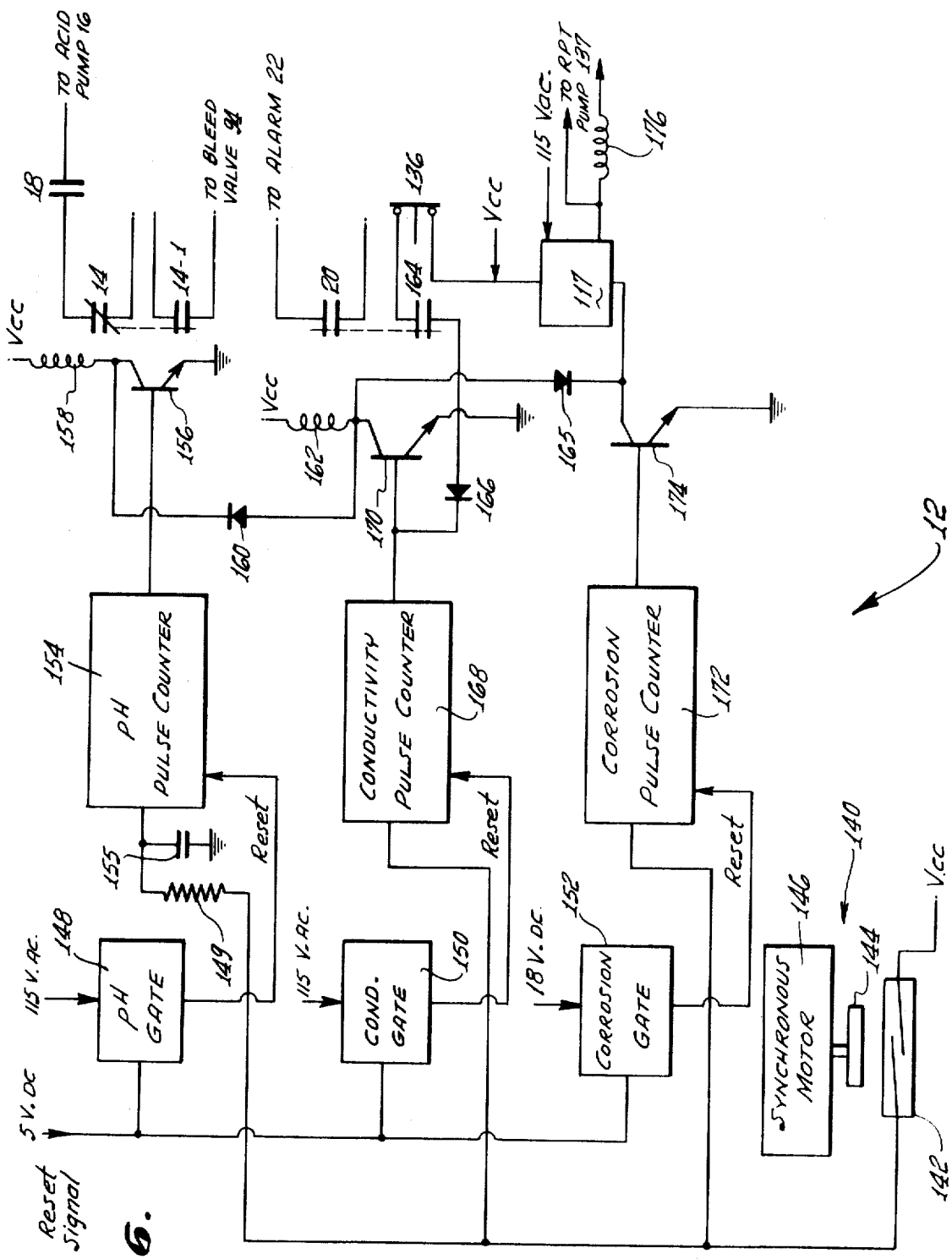

WATER TREATMENT SYSTEM

BACKGROUND OF THE INVENTION

1. Field of the Invention

This invention relates to a new and improved water treatment system for monitoring and controlling pH, total dissolved solids, corrosion rate, and conductivity, by using a new scanner circuit for continuously evaluating equipment performance and chemical levels in the water system.

2. Prior Art

Although water systems and means for controlling pH, conductivity, and corrosion rate, are well known in the art, applicants are unaware of any water treatment system which provides a combination of a continuous monitor and control of pH, total dissolved solids, conductivity, corrosion rate, and electronic means for taking corrective action as needed.

SUMMARY OF THE INVENTION

This invention includes a scanner circuit which controls various other component circuits in the water treatment system such as a pH control circuit, a conductivity control circuit, and a corrosion rate circuit. Various signals are sent out by each of these component circuits to the scanner which monitors the signals and takes corrective action when needed and terminates the corrective action when it is no longer necessary.

The scanner circuit has a timer matrix which receives the signals from each of the various components of the water treatment system, determines whether corrective action is needed, initiates such corrective action, and terminates the corrective action when it is no longer needed.

It is, therefore, an object of the invention to provide a system for automated chemical control of water cooling systems which automatically monitors the pH of the water, the total dissolved solids and conductivity, and the corrosion rate, and which takes rapid corrective action as needed.

Another object of the invention is to provide a scanner circuit for receiving signals from the various component control circuits of the water treatment system and for determining whether corrective action is needed.

A further object of the invention is to provide a scanner circuit which initiates corrective action upon receiving signals from any one or all of the various component control circuits of the water treatment system.

A still further object of the invention is to provide a scanner circuit which is capable of terminating corrective action when required by any one or all of the various component control circuits of the water treatment system.

A yet further object of the invention is to provide a scanner circuit which produces continuous monitoring of the various component control circuits of the water treatment system.

These and other objects of the invention will be more readily understood by reference to the following description, taken in conjunction with the accompanying drawings and claims, in which FIG. 1 illustrates an overall schematic diagram of the various components of the water treatment system.

FIG. 6 illustrates the details of a schematic diagram of the timer matrix system of the scanner circuit.

Figure 1:
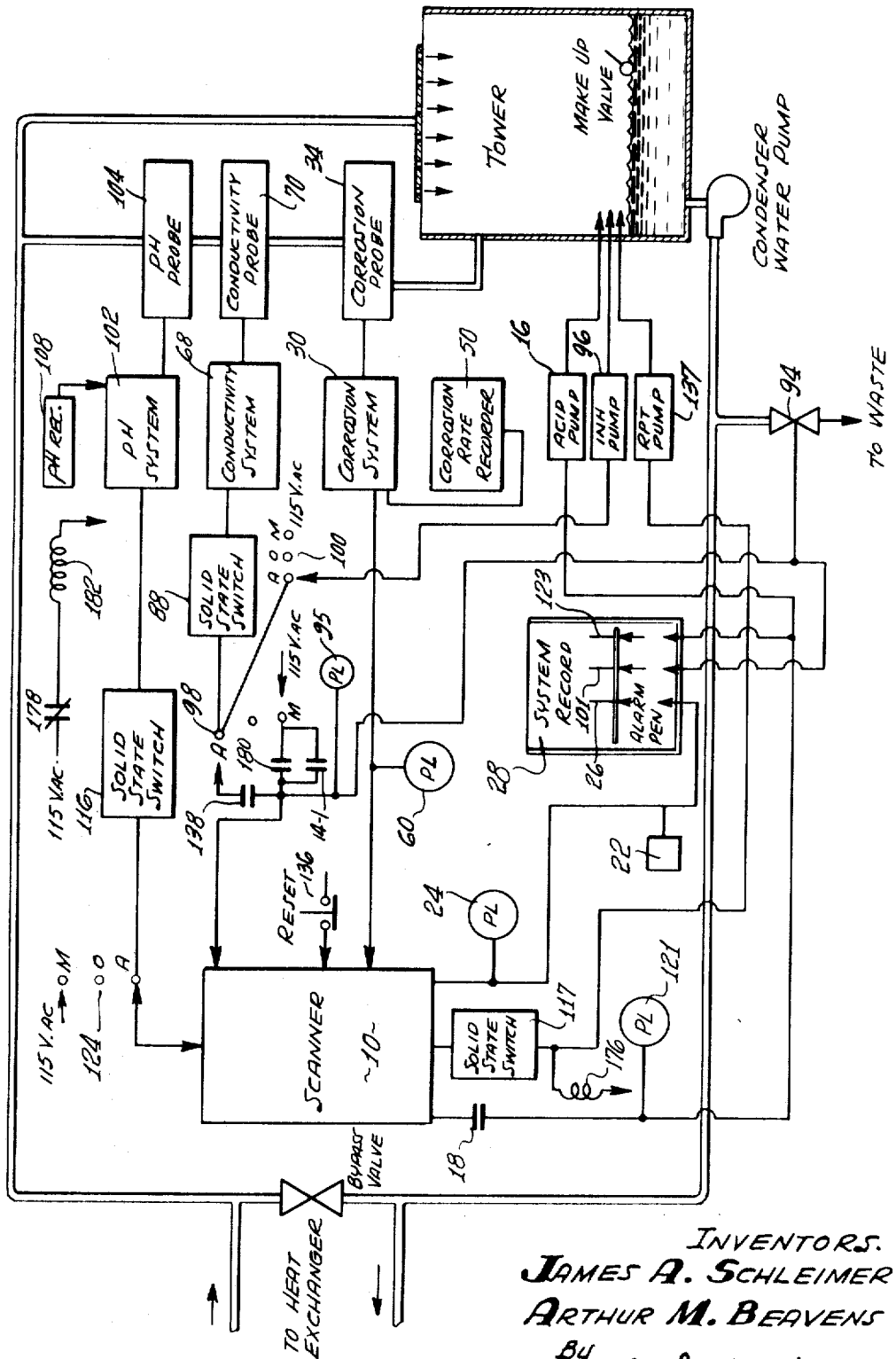
Figure 2:
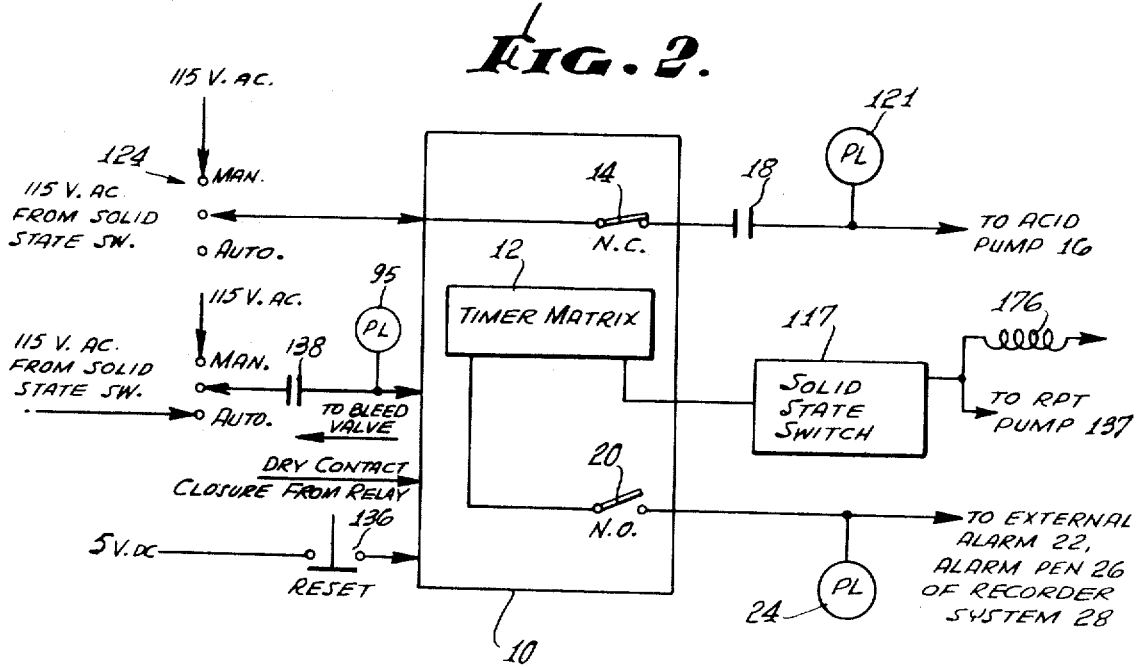
FIG. 2 illustrates the details of a schematic diagram of the scanner circuit system.

The invention is designed for use in water systems in conjunction with modern heat exchange equipment. Such heat exchange equipment provides maximum heat exchange with minimum surface area. Water for such heat exchange equipment requires proper chemical treatment to prevent scaling and corrosion.

Scaling occurs when any one or more ingredients dissolved in the water reaches its saturation point regardless of the cause, and precipitates out of solution. Such causes may be increase in temperature, increase in alkalinity, or increase in dissolved solids concentration by evaporation of the water. Scaling is usually controlled by adjusting the pH of the water, by adding scale inhibitors, or by opening a bleed valve to remove water containing the ingredient or ingredients causing scaling because of too high concentration and allowing fresh water to enter the system and dilute the remaining water below the saturation point of the ingredient or ingredients causing scaling.

As an example, calcium carbonate is a primary source of scaling in a recirculating water system. The saturation point of dissolved calcium carbonate in water can be controlled by adding an acid, such a sulfuric acid, to the water system to lower the alkalinity or pH of the water, which renders the calcium carbonate more soluble. Also, a bleed valve may be used to remove part of the water containing calcium carbonate in too high a concentration and adding fresh water to dilute the remaining water to a point below the saturation point of the calcium carbonate.

Either of the above-described actions, or both, may be controlled singly or together by electrical measurement of the dissolved ingredients in the water and by initiating through electrical means, either the addition of acid or the operation of a bleed valve, or both.

Similarly, corrosion is affected by increase in the temperature, changes in alkalinity, by increases in the concentration of total dissolved solids, and by the flow rate. In evaporative recirculating water systems, chemical corrosion inhibitors are commonly added to the water to protect metal surfaces from corrosion. Such inhibitors are phosphates, chromates, nitrites, and zinc salts, used singly, or in various combinations. Such inhibitors are added by a pump, known as an inhibitor pump, or manually.

Inhibitors are added initially in high concentrations to pretreat the system before it is placed under load conditions. After any upset in the treatment process which can cause a corrosive condition, these chemicals are again added in high concentrations to repretreat the system to build an impervious protective film on metal parts of the system. A pump known as a repretreat pump is preferably used for this repretreatment process, although any other suitable method of adding these chemicals may be used. During normal operations, these chemicals are added proportionately to maintain a desired inhibitor concentration.

To maintain control of corrosion of the general or pitting type, the corrosion rate is measured continuously by electrical devices which can also signal the need for remedial action when needed. Such devices may also provide means for causing the addition of corrosion inhibitors as needed.

The scanner circuit of the invention provides a means for activating an acid of alkali pump to control pH, a bleed valve, a chemical pump, and various alarms and recording devices, when used in conjunction with a pH-sensing device, a conductivity-measuring device, and a corrosion-measuring device.

The following is a detailed explanation of the construction and operation of the water treatment system.

The scanner circuit 10 has a timer matrix 12 which is capable of receiving signals from each of the various components of the water treatment system. The timer matrix 12 times the length of various periods of time in which various corrective actions are being taken, as well as causing the initiation of various corrective actions. Contact 14 of the scanner circuit 10 is normally closed and is connected to an acid pump 16 through a contact 18. Alarm relay contact 20 leads to an external alarm 22, a pilot light 24, and an alarm pen 26 of the system recorder 28. The details of the scanner circuit 10 will be discussed after the following components of the system.

The corrosion monitor system 30 operates with a small DC voltage from the power supply 32 which is supplied alternately to a pair of electrodes 34 exposed to the water. The corrosion rate of the water is measured by a reversing relay 36 controlled by an adjustable timer 38. Relay 36 has contacts 35. A current responsive to the corrosion rate of the water flows through a resistor 40 and produces a voltage. This voltage reverses in polarity each time that the relay 36 operates. Another relay 42 operates in phase with said relay 36 and produces an output voltage of one polarity. This relay 42 has contacts 41. This voltage is applied through contact 45 of relay 43 for a brief period of time during each half-cycle and is stored in the sample and hold amplifier 44 through the action of a storage capacitor 46.

Each half-cycle will have a different voltage level, and the average of the two readings is representative of the general corrosion rate. The difference between the two readings is representative of the corrosion pitting tendency. The higher of these two values is called the "high" reading, and the latching and unlatching of the relay 48 will synchronize with the "-high" half-cycle.

The output voltage of the sample and hold amplifier 44 is applied to a recorder 50 to produce a permanent record. The voltage is also applied to a voltage comparator 52 and compared with a reference voltage produced by variable resistor 54. The bistable output of the comparator amplifier 52 is applied to a transistor switch 56 which operates relay 48 when the corrosion voltage exceeds the reference voltage. One set of the contacts of relay 48 provides a signal to the scanner 10 and to the corrosion pilot light 60. The other set of contacts of relay 48 electrically latches relay 48 through feedback to transistor 56. Resistor 57 is a current-limiting resistor. Resistors 59 and 61 provide a dead band. Diodes 63 and 65 provide isolation of the circuits. A one-shot multivibrator 64 provides an unlatched pulse at the beginning of each "high" half-cycle which releases the relay 48 through transistor 62 if no latch signal is presented by the comparator amplifier 52.

Resistor 67 provides current limiting and connects sample and hold amplifier 44 to voltage comparator 52.

As previously indicated, the mineral content or dissolved solids in the water system is measured by a conductivity controller. The conductivity controller 68 operates by applying an AC voltage to the electrodes 70 which causes a current to flow through the particular part of the water system to be measured. The AC current is converted into direct current by diode 72. A variable resistor 74 develops a voltage which is responsive to the conductivity of the water. This voltage is filtered by capacitor 76 and applied to one input of a comparator amplifier 78. A reference voltage is developed by diode 80, potentiometer 82, and capacitor 84. This reference voltage is applied to the other input of the comparator amplifier 78. When the concentration of the dissolved solids increases, thereby increasing the conductivity voltage to a level which exceeds the reference voltage, transistor 86 conducts and activates a solid state switch 88. Resistors 90 and 92 provide a dead band.

Upon activation, the solid-state switch 88 applies a voltage to operate or open bleed valve 94, activate pilot light 95 and operate inhibitor pump 96 through individual auto-off-manual switches 98 and 100 and activate system recorder pen 101.

The pH meter-recorder-controller system 102 has a pH-sensitive electrode 104 put into the water system to be controlled and produces a DC voltage proportional to the pH. This voltage is amplified by a high-impedance amplifier 106 and provides an output voltage to operate the recorder 108, and also provides an input voltage to the comparator amplifier 110. A reference voltage is produced across the potentiometer 112 and applied to the other comparator input. When the pH voltage exceeds the reference voltage, transistor 114 conducts and operates the solid-state switch 116. Resistors 118 and 120 provide a dead band. The solid-state switch 116 applies a voltage (115 AC line voltage) through auto-off-manual switch 124 and through the scanner circuit 10 to operate the acid pump 16, activate pilot light 121, and activate system recorder pen 121.

The timer matrix 12 of the scanner circuit 10 has a pulse generator 140 which generates uniform timing pulses by means of a voltage applied through a reed switch 142 in conjunction with a magnet 144 rotated by a synchronous motor 146. The timing pulses are applied directly to pH pulse counter 154, conductivity pulse counter 168, and corrosion pulse counter 172 and are controlled by three separate and individual gate devices, a pH gate 148, a conductivity gate 150, and a corrosion gate 152.

The pH gate 148 is of conventional circuit design. It receives a 115-volt AC input signal through auto-off-manual switch 124 when solid-state switch 116 is operating in the pH meter-recorder-controller system 102. At all times, a reset signal of 5 volts DC is being fed continuously in pH gate 148 from a suitable power source (not shown) and from pH gate 148 into pH pulse counter 154. The pH gate 148 has a diode (not shown) to rectify the incoming 115-volt AC signal, and current-limiting resistor 149. The pH pulse counter 154 contains four binary storage or flip-flop elements of conventional design and has eight count stations preferably.

Both the pH gate 148 and the pH pulse counter 154 may be of any type of design that will produce the requisite outputs needed by the scanner circuit 10 to produce the desired action.

The pH pulse counter 154 continuously receives the timing pulses from the pulse generator 140 through a suitable 5-volt DC system power source (not shown). The pH pulse counter 154 has a relay contact 155 of relay coil 158 to shunt the input to ground after eight counts of the pH pulse counter 154 have occurred.

The output from the pH pulse counter 154 leads to driver transistor 156, which in turn is connected to relay coil 158. Upon being energized, relay coil 158 actuates relay contact 14 which controls acid pump 16, and if relay contact 14-1, an optional contact, has been added to the circuit, relay coil 158 also actuates relay contact 14-1 which controls the activation or opening of the bleed valve 94.

Diode 160 is connected to driver transistor 156 and leads to relay coil 162 which can actuate alarm relay contact 20 and latches reset switch 136 electrically through contact 164.

Figure 3:
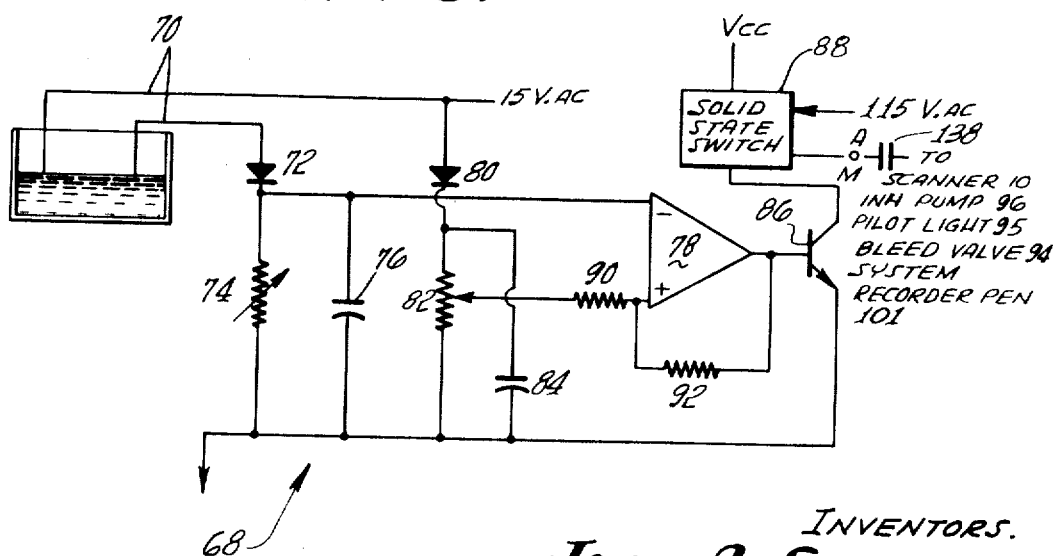
FIG. 3 illustrates the details of a schematic diagram of the conductivity controller system.

Conductivity gate 150 is connected to a conductivity pulse counter 168 which also contains four binary storage or flip-flop elements and has eight count stations. Conductivity gate 150 is of similar construction to pH gate 148, and includes a diode (not shown) to rectify the incoming 115-volt AC signal from auto-off-manual switches 98 and 100 when solid switch 88 is activated in the conductivity controller system of FIG. 3.

At all times, a reset signal of 5 volts DC is fed continuously into conductivity gate 150 from a suitable power source 9 (not shown) and from the conductivity gate 150 into the conductivity pulse counter 168.

The conductivity pulse counter 168 continuously receives the timing pulses from the pulse generator 140 operated by a suitable 5-volt DC system power source (not shown).

Like the pH gate 148 and the pH pulse counter 154, both the conductivity gate 150 and the conductivity pulse counter 168 may be of any design suitable for the production of the outputs needed by the scanner circuit 10 to produce the desired action. Like the pH pulse counter 154, the conductivity pulse counter 168 preferably has eight count stations.

The output from the conductivity pulse counter 168 leads to driver transistor 170 which is connected to coil 162 which in turn can actuate alarm relay contact 20 and alarm 22 and also latches reset switch 136 electrically through contact 164. Diode 166 connects driver transistor 170 to contact 164.

Figure 4:
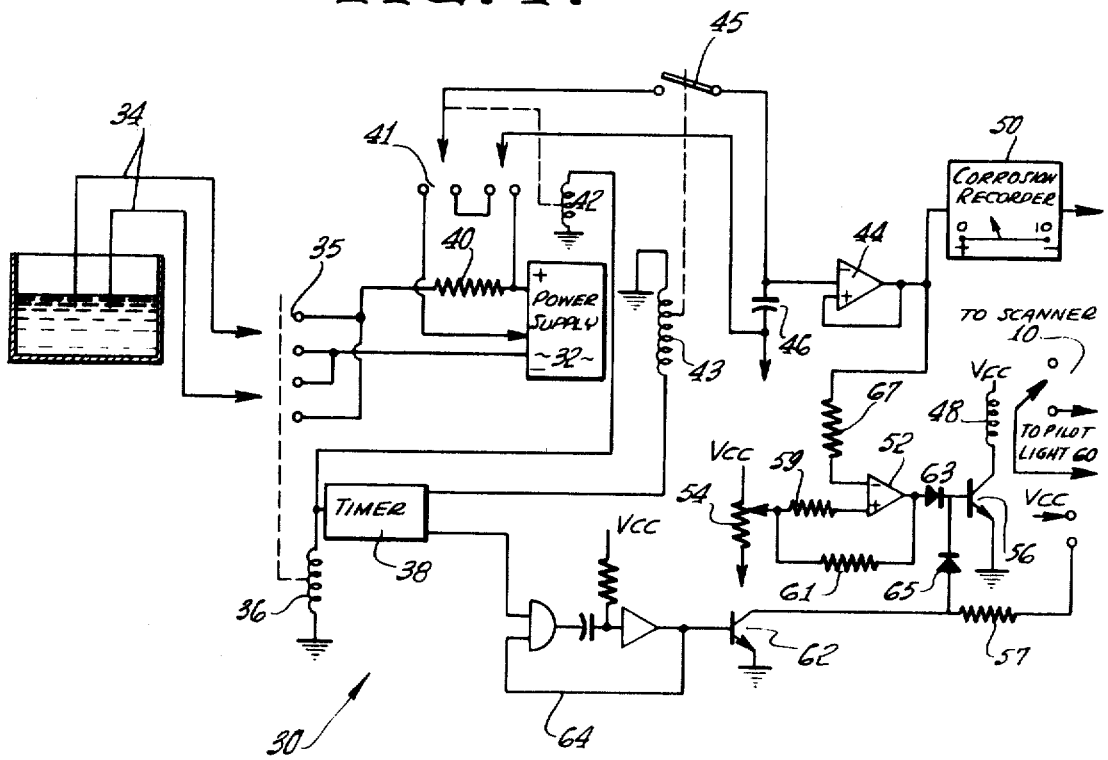
FIG. 4 illustrates the details of a schematic diagram of the corrosion monitor system.
Figure 5:
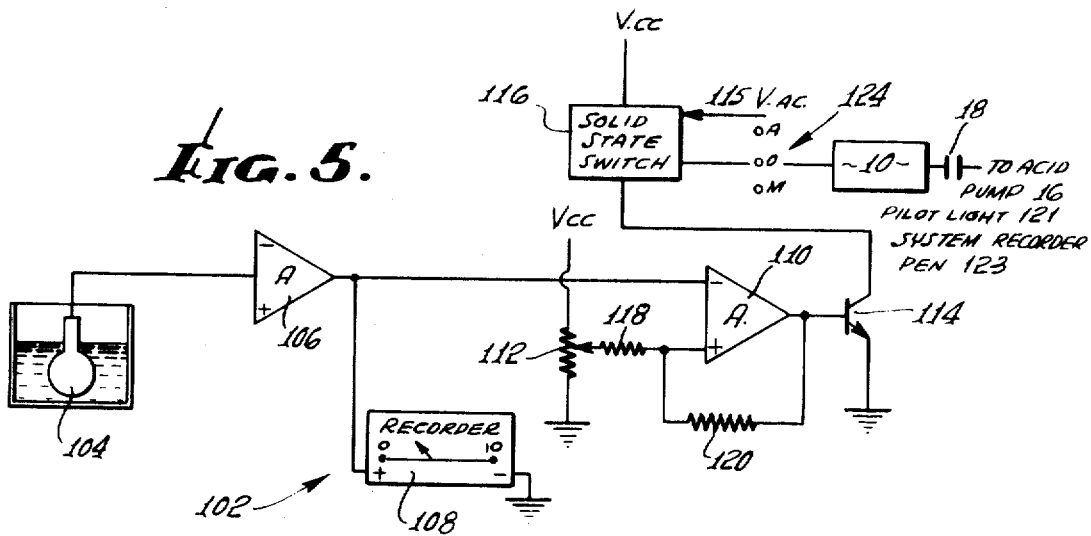
FIG. 5 illustrates the details of a schematic diagram of the pH meter-recorder-controller system.

Corrosion gate 152 is connected to a corrosion pulse counter 172 which receives the output of corrosion gate 152 and which also contains four binary storage or flip-flop elements and a total of eight count stations. Corrosion gate 52 if of similar construction to pH gate 148 but needs no rectifying diode since its input is 18 volts DC from relay 48 when the corrosion voltage exceeds the reference voltage in the circuit shown in FIG. 4.

Again, both the corrosion gate 152 and the corrosion pulse counter 172 may be of any design capable of providing the utput needed by the scanner circuit 10 to produce the esired action.

At all times, a reset signal of 5 volts DC is fed continuously ito corrosion gate 152 through a suitable power source (not 1own) and from corrosion gate 152 into corrosion pulse ounter 172.

The corrosion pulse counter 172 continuously receives the ming pulses from the pulse generator 140 operated by a iitable 5-volt DC system power source.

The output from the corrosion pulse counter 172 leads to river transistor 174 which is connected to solid-state switch 17 which in turn leads to the repretreat pump 137 and to lay coil 176. Diode 165 connects transistors 174 and 170.

Relay coil 176 has two contacts, 178 and 180. Contact 178 f relay coil 176 is connected to relay coil 182 which controls :id pump 16 through contact 18, and bleed valve 94 through mtact 138. Contact 180 of relay coil 176 also controls the eed valve 94 action, if contact 180 is used in the circuit. hen relay coil 176 is energized, it closes contact 180 which turn activates the bleed valve circuit and operates or opens ie bleed valve 94.

An additional relay contact 14-1 may be added optionally parallel to relay 14. Relay contact 14-1 leads to the bleed ilve 94 so that when driver transistor 156 is activated, both mtacts 14 and 14-1 are activated, thereby causing the iutting off of the acid pump 16 and the simultaneous activa- n or opening of bleed valve 94.

In operation, the various outputs from the corrosion moni- r system 30, the conductivity controller system 68, and the l meter-recorder-controller system 102, are fed into the anner circuit system 10 and into the timer matrix 12 of the anner circuit system 10.

The pulse generator 140 of the scanner circuit 10 is set for a ven frequency of pulses, preferably a pulse for each 5 inutes, by setting the syncronous motor 146 at a suitable eed that will produce the desired pulse rate. The pulse inter- ls may be varied from a minimum of one for every 3 minutes ) to a maximum of one for every 8 minutes. For the embodi- ent of the invention described herein, one pulse every 5 inutes is optimum.

At a time when no input voltage is coming from any of the dividual systems, i.e., the corrosion monitor system 30, the inductivity controller system 68, or the pH meter-recorder- introller system 102, no counting takes place in the timer atrix 12 because the 5-volt DC reset voltage holds the pH ilse counter 154, the conductivity pulse counter 168, and e corrosion pulse counter 172, in a zero state by maintaining iltage on one side continuously therein.

When an input voltage comes in, either 115 volts AC for the l pulse counter 154 and/or the conductivity pulse counter i8 and/or 18 volts DC for the corrosion pulse counter 172, e respective gates cause the reset voltage to disappear, so at the pulses from the pulse generator 140 may then act on e counters, causing them to count.

The 115-volt AC input to the pH gate 148 occurs when the l of the water rises to a level that produces a voltage greater an the reference level. This voltage is applied through solid ite switch 116 to operate the acid pump 16 and to provide e input to the pH gate 148 in the scanner circuit 10. This out causes the pulse counter 154 to begin counting, and ien the pulse counter 154 reaches a count of eight, the edetermined number of counts set by the timer matrix, iver transistor 156 is activated and energizes coil 158, which en opens contact 14, which in turn opens the acid pump cir- it (not shown) and stops the acid pump 16. Also, when iver transistor 156 is activated, it energizes relay coil 162 iich closes alarm relay contact 20, thereby activating exter- l alarm 22, pilot light 24, and alarm pen 26.

When relay contact 14-1 is incorporated in the circuit, the tivation of coil 158 closes relay contact 14-1 which in turn )ses the bleed valve circuit thereby operating or opening :ed valve 94.

The 115-volt AC input to the conductivity gate 150 occurs when the conductivity controller circuit 68 causes the solid-state switch 88 to be activated when the concentration of dissolved solids increases. The AC input, similarly to the input to the pH gate 148, causes the conductivity pulse counter 168 to begin counting, and after eight counts, driver transistor 170 is activated, which in turn causes alarm relay contact 20 to actuate alarm 22, pilot light 24, and alarm pen 26.

The 18-volt DC input to the corrosion gate 152 occurs when the corrosion voltage exceeds the reference voltage of the corrosion monitor system 30, which operates relay 48 which in turn transmits the 18-volt DC signal to the scanner circuit 10.

The 18-volt DC input causes the corrosion pulse counter 172 to begin counting, and after four counts, driver transistor 174 activates solid-state switch 117, which in turn activates the repretreat pump 134 and relay coil 176 by applying 115 volts AC to them. Relay coil 176, through the action of relay contact 178, causes relay coil 182 to deactivate the acid pump 16 by opening relay contact 18. It also deactivates the bleed valve 94 by opening relay contact 138. The alarm relay contact 20 is also actuated by the action of coil 162 and reset switch 136 is latched electrically through diode 166 and contact 164. Coil 162 is activated by the action of transistor 174 through diode 175.

When alarm relay contact 20 is actuated and closes, it actuates alarm 22, pilot light 24, and alarm pen 26.

When relay contact 180 is incorporated in the system, the energizing of relay coil 176 closes contact 178 and contact 180. The result is that contact 178 permits the energizing of coil 182 which then opens contact 18 which in turn opens the acid pump circuit and stops the acid pump 16, and also opens relay contact 138 which deactivates the bleed valve circuit and bleed valve 94. However, when contact 180 is actuated and closes due to the action of relay coil 176, contact 180 closes the bleed valve circuit and operates or opens bleed valve 94 to make it operative.

After four more counts, making a total of eight counts, if the 18-volt DC input has stopped, driver transistor 174 stops operating, which in turn stops the repretreat pump 137, and allows operation of the acid pump 16 unless action of the pH meter-recorder-controller system 102 causes the acid pump 16 to remain deactivated, and returns control of bleed valve 94 to conductivity controller system 68. If the 18-volt DC input continues, the action that has been initiated continues also.

Once the alarm 22 has been activated, its action continues until reset switch 136 has been manually operated. However, reset switch 136 is ineffective if the system through the action of any of the components thereof still is signalling an alarm situation electrically.

Although we have described a preferred embodiment of the invention, it is understood that numerous changes may be made in the construction and arrangement of the various components and parts therein without departing from the spirit and scope of the invention as hereinafter claimed.

We claim:

1. A water treatment system for control of scaling and corrosion in recirculating evaporative water used with heat exchange equipment, comprising:

corrosion-measuring means responsive to the corrosion rate in said water and capable of producing a signal for remedial action when the corrosion rate exceeds a predetermined level;

conductivity-measuring means responsive to the concentration of dissolved solids in said water and capable of producing a signal for remedial action when the concentration of solids exceeds a predetermined level;

pH-sensing means responsive to the pH of the said water and capable of producing a signal for remedial action when the pH exceeds a predetermined level;

and scanner circuit means for receiving said signal from said corrosion-measuring means and for taking appropriate remedial action, said means for remedial action comprising means for actuating an alarm, a pilot light, and an alarm pen of a system recorder;
means for actuating a pump for adding chemicals to said water for a predetermined time period;
means for deactivating the action of a bleed valve, and
means for deactivating an acid pump.

2. A water treatment system for control of scaling and corrosion in recirculating evaporative water used with heat change equipment, comprising:
corrosion-measuring means responsive to the corrosion rate in said water and capable of producing a signal for remedial action when the corrosion rate exceeds a predetermined level;
conductivity-measuring means responsive to the concentration of dissolved solids in said water and capable of producing a signal for remedial action when the concentration of solids exceeds a predetermined level;
pH-sensing means responsive to the pH of the said water and capable of producing a signal for remedial action when the pH exceeds a predetermined level;
and scanner circuit means for receiving said signal from said corrosion-measuring means and for taking appropriate remedial action, said means for remedial action comprising
means for actuating an alarm, a pilot light, and an alarm pen of a system recorder;
means for actuating a pump for adding chemicals to said water for a predetermined time period;
means for activating a bleed valve, and
means for deactivating an acid pump.

3. A water treatment system for control of scaling and corrosion in recirculating evaporative water used with heat change equipment, comprising:
corrosion-measuring means responsive to the corrosion rate in said water and capable of producing a signal for remedial action when the corrosion rate exceeds a predetermined level;
conductivity-measuring means responsive to the concentration of dissolved solids in said water and capable of producing a signal for remedial action when the concentration of solids exceeds a predetermined level;
pH-sensing means responsive to the pH of the said water and capable of producing a signal for remedial action when the pH exceeds a predetermined level;
and scanner circuit means for receiving said signal from said pH-sensing means and for taking appropriate remedial action, said means for remedial action comprising
means for deactivating a pH control pump, and
means for actuating an alarm, a pilot light, and an alarm pen of a system recorder.

4. A water treatment system for control of scaling and corrosion in recirculating evaporative water used with heat change equipment, comprising:
corrosion-measuring means responsive to the corrosion rate in said water and capable of producing a signal for remedial action when the corrosion rate exceeds a predetermined level;
conductivity-measuring means responsive to the concentration of dissolved solids in said water and capable of producing a signal for remedial action when the concentration of solids exceeds a predetermined level;
pH-sensing means responsive to the pH of the said water and capable of producing a signal for remedial action when the pH exceeds a predetermined level;
and scanner circuit means for receiving said signal from said conductivity-measuring means and for taking appropriate remedial action, said means for remedial action comprising
means for actuating an alarm, a pilot light, and an alarm pen of a system recorder.

5. A water treatment system for control of scaling and corrosion in recirculating evaporative water used with heat change equipment, comprising:
corrosion-measuring means responsive to the corrosion rate in said water and capable of producing a signal for remedial action when the corrosion rate exceeds a predetermined level;
conductivity-measuring means responsive to the concentration of dissolved solids in said water and capable of producing a signal for remedial action when the concentration of solids exceeds a predetermined level;
pH-sensing means responsive to the pH of the said water and capable of producing a signal for remedial action when the pH exceeds a predetermined level; and
scanner circuit means for receiving said signal from said corrosion-measuring means and for taking appropriate remedial action, for receiving said signal from said conductivity-measuring means and for taking appropriate remedial action, and for receiving said signal from said pH-sensing means and for taking appropriate remedial action, said means for remedial action taken upon receiving a signal from the pH-measuring means comprising:
means for deactivating an acid pump;
means for activating a bleed valve; and
means for actuating an alarm, a pilot light, and an alarm pen of a system recorder.

6. A scanner circuit for taking remedial action upon receiving a signal from a pH-sensing means of a water treatment system, comprising:
a pulse generator capable of producing uniform timing pulses;
pH gate means for receiving a signal from the pH-sensing means and for providing an output voltage which overrides a reset voltage being fed continuously into said pH gate means;
pH pulse counting means having a plurality of binary count stations and capable of receiving the timing pulses of the pulse generator and counting upon receiving the output from said pH gate means; and
circuit means for controlling an acid pump, a bleed valve, an alarm, an alarm pen, and a pilot light, upon activation by a signal from the said pH pulse counting means.

7. A scanner circuit for taking remedial action upon receiving a signal from a corrosion-measuring means of a water treatment system, comprising:
a pulse generator capable of producing uniform timing pulses;
corrosion gate means for receiving a signal from the corrosion-measuring means and for providing an output voltage which overrides a reset voltage being fed continuously into said corrosion gate means;
corrosion pulse counting means having a plurality of binary count stations and capable of receiving the timing pulses of the pulse generator and counting upon receiving the output from said corrosion gate means; and
circuit means for controlling a pump for adding chemicals, a pump for controlling pH of the water, deactivating a bleed valve, and actuating an alarm, an alarm pen, and a pilot light, upon activation by a signal from the said corrosion pulse counting means.

8. A scanner circuit for taking remedial action upon receiving a signal from a conductivity-measuring means of a water treatment system, comprising:
a pulse generator capable of producing uniform timing pulses;
conductivity gate means for receiving a signal from the conductivity-measuring means and for providing an output voltage which overrides a reset voltage being fed continuously into said conductivity gate means;
conductivity pulse counting means having a plurality of binary count stations and capable of receiving the timing pulses of the pulse generator and counting upon receiving the output from said conductivity gate means; and
circuit means for actuating an alarm, an alarm pen, and a pilot light, upon activation by a signal from said conductivity pulse counting means.